United States Patent [19]

Zydek et al.

[11] Patent Number: 5,411,324
[45] Date of Patent: May 2, 1995

[54] CIRCUIT CONFIGURATION FOR A CONTROLLER

[75] Inventors: Michael Zydek, Frankfurt/Hoechst; Wolfgang Fey, Woerrstadt, both of Germany

[73] Assignee: Alfred Teves GmbH, Germany

[21] Appl. No.: 122,564

[22] PCT Filed: Mar. 19, 1993

[86] PCT No.: PCT/EP92/00600

§ 371 Date: Sep. 30, 1993

§ 102(e) Date: Sep. 30, 1993

[87] PCT Pub. No.: WO92/17358

PCT Pub. Date: Oct. 5, 1992

[30] Foreign Application Priority Data

Mar. 30, 1991 [DE] Germany .................. 41 10 497.8
May 25, 1991 [DE] Germany .................. 41 17 099.7

[51] Int. Cl.⁶ .................. B60T 8/60; B60T 13/66; B60R 16/02; B60K 28/16
[52] U.S. Cl. .................. 303/92; 307/10.1; 303/20; 303/100; 361/91; 361/160
[58] Field of Search .................. 303/92, 100, 95, 102, 303/103, 20; 364/426.01, 426.02, 426.03; 188/181 R, 181 A; 318/564, 52; 307/10.1; 361/193, 192, 205, 206, 90–92, 160, 187; 324/500, 503; 377/32; 363/53, 56; 323/277, 279

[56] References Cited

U.S. PATENT DOCUMENTS

| | | |
|---|---|---|
| 3,911,392 | 10/1975 | Fleagle . |
| 4,113,321 | 9/1978 | Bleckmann . |
| 4,546,437 | 10/1985 | Bleckmann et al. . |
| 4,703,388 | 10/1987 | Ruhnau .................. 361/91 |
| 4,773,013 | 9/1988 | Crapanzano et al. .......... 303/95 X |
| 5,004,970 | 4/1991 | Barou .................. 361/91 X |
| 5,205,619 | 4/1993 | Holst et al. .................. 303/92 |
| 5,225,805 | 7/1993 | Cage et al. .................. 303/92 |
| 5,309,314 | 5/1994 | Loreck et al. .................. 361/160 |

FOREIGN PATENT DOCUMENTS

| | | |
|---|---|---|
| 0179194 | 4/1986 | European Pat. Off. . |
| 0214921 | 3/1987 | European Pat. Off. . |
| 2612356 | 9/1977 | Germany . |
| 2938344 | 4/1981 | Germany . |
| 3234630 | 3/1984 | Germany . |
| 3234637 | 3/1984 | Germany . |
| 3237164 | 4/1984 | Germany . |
| 3401761 | 8/1985 | Germany . |
| 3435055 | 4/1986 | Germany . |
| 3512110 | 10/1986 | Germany . |
| 3603659 | 7/1987 | Germany . |
| 4004427 | 8/1990 | Germany . |
| 3924988 | 1/1991 | Germany . |

*Primary Examiner*—Douglas C. Butler
*Attorney, Agent, or Firm*—Ratner & Prestia

[57] ABSTRACT

A circuit configuration for an electronic controller has a monitoring circuit which, upon detecting a defective condition, malfunction or defective power supply, maintains the actuator elements of the controller in their initial positions or restores the actuator elements of the controller to their initial positions. These actuator elements can be, for example, the magnetic valves of an antilocking brake system. The monitoring circuit checks, before excitation of a power supply relay, the connection of the relay to the power supply, the blocking condition of a switching transistor, through which the power supply relay (Rel) is activated, and the separating position of the power supply contact of the power supply relay. Moreover, the monitoring circuit responds to overvoltages.

20 Claims, 3 Drawing Sheets

CIRCUIT CONFIGURATION FOR A CONTROLLER

BACKGROUND OF THE INVENTION

This application is a 371 of PCT/EP92/00600 filed on Mar. 19, 1992.

The present invention relates, in general, to a circuit configuration for an electronic controller and, in particular, to a controller of a brake system having an electronic anti-locking control and/or traction slip control. This circuit configuration includes a monitoring circuit which, upon detection of a defective condition, malfunction, defective power supply or the like, will either maintain various actuator elements excited by the controller in their initial positions or restore various actuator elements excited by the controller to their initial positions. The actuator elements can be, for example, setting elements or magnetic valves of an electronically controlled brake system which are connected to a relay contact of a power supply relay that closes upon activation of the controller for supplying power to the actuator elements.

For safety reasons, brake systems that are provided with an electronic anti-locking control or traction slip control are designed such that, in a defective condition of the electronic control system or in the event of a power break-down, the magnetic valves of the brake system take a resting position, wherein the full brake effect—although uncontrolled—is ensured. The electronic system, as a consequence of malfunction or power break-down, must not be allowed to result in a failure of the brake system. To ensure this, the antilocking controller according to DE-PS 26 12 356 is equipped with a monitoring circuit which, upon occurrence of an error in the electronic control system, will deactivate the power supply relay. With the magnetic valves of the anti-locking controller also connected through the working contact of the relay, upon occurrence of such an error, the magnetic valves either remain in their resting position or are restored to their resting position. Pending removal of such error, only a conventional braking operation is possible, so as to ensure that the valves cannot exert an adverse influence on the brake function. The state-of-the-art monitoring circuit, for the most part, is in an intrinsically safe configuration so that the errors in both the electronic anti-locking control and in the monitoring circuit will result in deactivation of the power supply relay.

According to DE-OS 32 34 637, the continued operation of a conventional brake system, upon occurrence of a defective condition in the electronic system, is essentially ensured in the same manner, that is, by deactivating the power supply to the magnetic valves.

Moreover, DE-OS 39 24 988 teaches an actuator driven power supply relay comprising two series-connected transistors and a power supply relay which connects the magnetic valves of an anti-locking control system to the battery. A defective condition of one of the two transistors is detected by way of a test circuit, whereupon the power supply relay is deactivated.

SUMMARY OF THE INVENTION

It is an objective of the present invention to provide a circuit configuration for an electronic controller in which defects of varying types are detected early to result in a reliable deactivation of the controller to prevent the system controlled by the controller, such as a brake system of an automotive vehicle, from being inoperative due to a failure in detecting a defective condition of the controller in due time.

It has been found that this objective can be achieved by a circuit configuration having a monitoring circuit which, upon actuation of the controller prior to closure of the relay contact, will first check the connection of the relay to the power supply as well as the open or separating position of the relay contact. The monitoring circuit then activates the power supply relay to generate, after having checked the supply voltage supplied through the closed relay contact, a release signal for activating the controller and/or for excitation of the actuator elements.

The circuit configuration according to the present invention ensures that the magnetic valves or other actuator elements can, in fact, be activated only if the components operate properly and voltage levels, as checked, are error-free. Even errors, such as a "sticky" working contact of the power supply relay which, hitherto, could not be detected, will be identified. The redundant blocking of the valve actuation, caused by a drop of the power supply relay and the absence of the release signal, will insure that even upon occurrence of so called double errors, the controller is deactivated, thereby eliminating safety-critical malfunctions that are likely to occur, for example, in electronically controlled brake systems.

According to an advantageous embodiment of the invention, the monitoring circuit will excite a transistor through which the power supply relay is activated, with the blocking function of the transistor being checked upon activation of the controller by first blocking the activation of the transistor. Moreover, in a variety of cases it is advantageous for the monitoring circuit to check, either before or after generation of the release signal, the level of the supply voltage supplied through the relay contact and to deactivate the power supply relay and/or to clear the release signal once the supply voltage exceeds an upper limit value or falls below a lower limit value. A restriction to a pure overvoltage monitoring is equally possible.

According to another embodiment of the invention, the monitoring circuit, at the same time, monitors additional circuits of the controller which, in proper operation, generate predetermined permanent signals or alternating signals of a predetermined frequency. For example, output signals of so called "watch-dog" circuits will be available, with the function in proper condition, in the form of an alternating signal of a predetermined frequency. Once malfunction is detected by the monitoring circuit, it deactivates the power supply relay and/or clears the release signal.

Finally, according to another embodiment of the invention, the voltage drop across the relay actuating transistor, upon activation of the relay, is monitored. The monitoring circuit responds when the voltage exceeds a maximum value.

Further features, advantages and fields of application of the invention will become apparent from the following description of one embodiment of the invention with reference to the enclosed drawings showing circuits and a flow diagram.

DETAILED DESCRIPTION OF THE INVENTION

Figure 1:
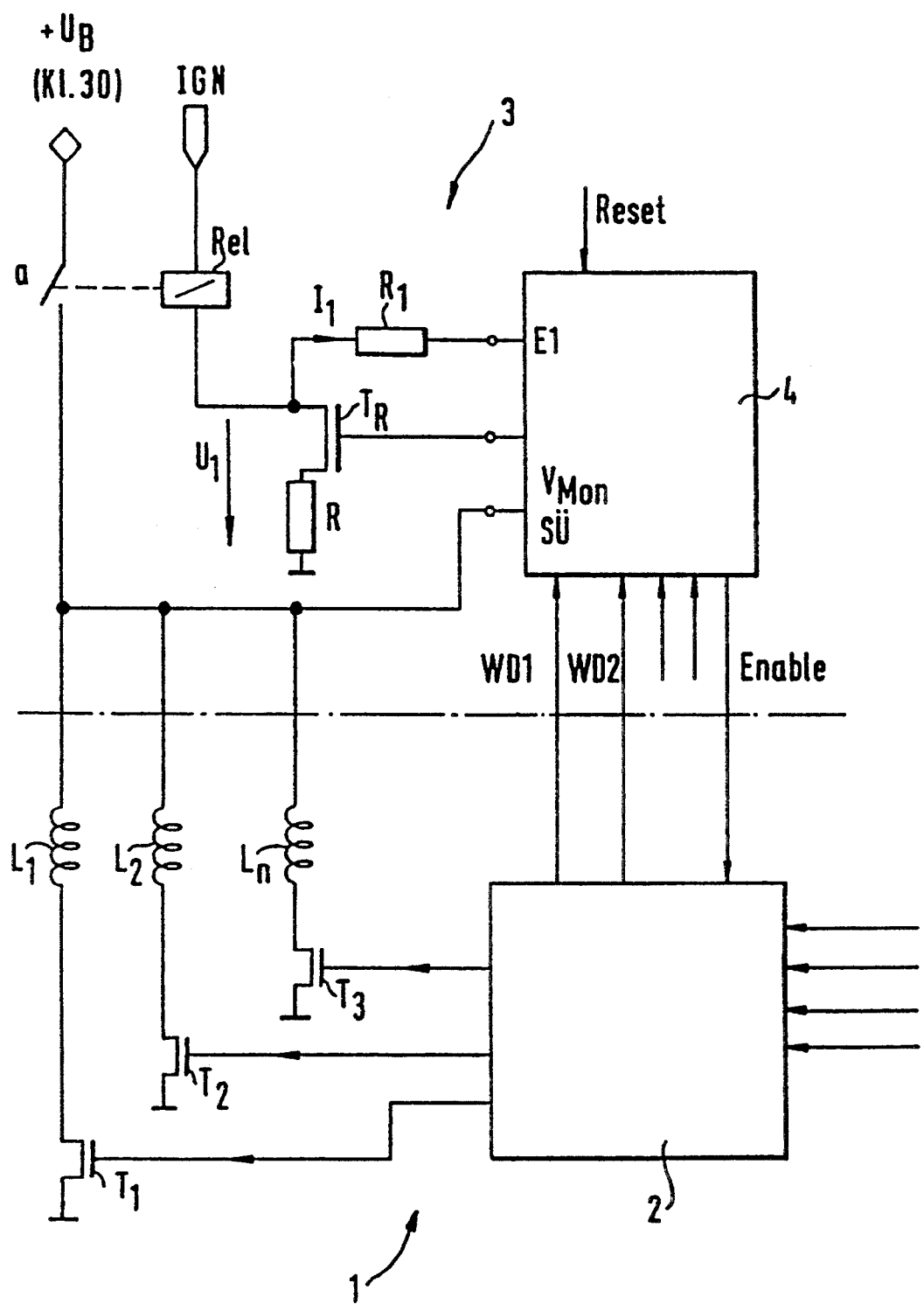
FIG. 1 is a block diagram of the major components of a circuit configuration according to the present inven
Figure 2:
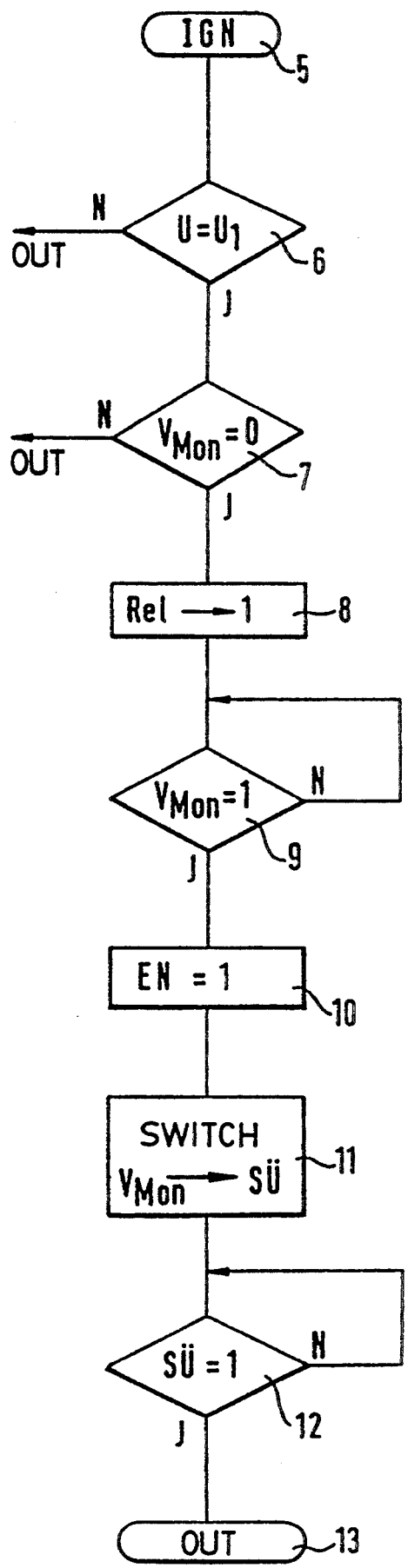
- FIG. 2 is a flow diagram of an actuating process, employing the circuit configuration of FIG. 1.

The basic design and mode of operation of a circuit configuration according to the present invention is illustrated by the block diagram of FIG. 1 in conjunction with the flow diagram of FIG. 2.

The electronic controller 1, supplemented by the circuit configuration 3 of the present invention, is illustrated in FIG. 1 only by exciting coils $L_1$, $L_2$, ... $L_n$ of some actuator elements, the associated driver stages $T_1$, $T_2$ ... $T_n$ and the exciter circuit 2 thereof. These are, for example, the exciting coils $L_1$, $L_2$ ... $L_n$ of the magnetic valves in the brake conduits of an anti-locking brake system. The wheel sensors, required by such a brake system, the associated electronic circuits or microcomputers for processing the signals and for generating brake pressure control signals which are supplied to the exciting circuit 2 of the controller 1, are not shown. As is well known, the excitation of the magnetic valves of a controlled brake system, such as an anti-locking control system (ABS), is likely to result in critical situations when the brake effect is reduced due to malfunction of the electronic system. The circuit configuration according to the present invention, generally designated by reference numeral 3, precludes a danger of that type by preventing activation of the magnetic valves of controller 1 upon detection of an error or malfunction.

The circuit configuration 3 of FIG. 1 comprises a monitoring circuit 4, a switch transistor $T_R$ and a power supply relay Rel. The relay Rel is coupled to a working contact "a" through which the magnetic valves $L_1$, $L_2$ ... $L_n$ or actuator elements of the controller 1 are connected to the battery of the automotive vehicle with voltage $U_B$, and also to the power supply (K1.30). The power supply relay Rel, in that instance, is connected, through a contact of the ignition switch IGN of an automotive vehicle, to the battery and to the power supply of the automotive vehicle. The actuation of the ignition, hence, will initiate the operation of the circuit configuration 3 of the invention in a manner to be explained hereinafter with reference to the flow diagram as shown in FIG. 2. The voltage across the switching transistor $T_R$ and across a grounded resistor R, is designated by reference numeral $U_1$.

Referring to FIG. 2, the actuation of the ignition system, represented by threshold 5 (IGN), initiates the process. A predetermined voltage IGN only exists at input E1 in FIG. 1 if the (a) relay Rel is properly mounted, (b) transistor $T_R$ in the power supply path of the power supply relay Rel is not excited and is not in a defective condition, and (c) the ignition switch IGN is not closed. Hence, once the $U=U_1$ requirement has been satisfied, as shown in step 6, step 7 will then follow. In case of non-compliance (N) with this requirement in step 6, the process terminates (AUS) and the controller 1 will not be activated.

At such time, the working contact "a" of the power supply relay Rel, as shown in FIG. 1, is required to remain opened. Hence, the voltage across input $V_{Mon}$ is zero. Once this requirement is complied with (J), now represented by process step 8, transistor $T_R$ is excited by the monitoring circuit 4 of FIG. 1, thereby setting the power supply relay Rel=1. A release signal Enable (EN) is not generated at this time but rather only if battery voltage $U_B$ is passed through the closed contact "a" of the power supply relay Rel, to the terminal or to the input $V_{Mon}$ of the monitoring circuit 4. Pending closure of the relay contact "a", a delay time of a few milliseconds may occur, in step 9, the question is repeated or a loop is formed as long as the $V_{Mon}=1$ requirement has not been satisfied with (N). Only after compliance with the $V_{Mon}=1$ requirement, in step 10, is the release signal Enable, i.e. EN=1, released, thereby actuating controller 1 of FIG. 1 via a path not shown.

Moreover, once the $V_{Mon}=1$ requirement has been satisfied and the release signal EN=1 has been generated, the input of the monitoring circuit 4 of FIG. 1, which monitors the closing of the relay contact "a", is now switched to voltage monitoring SÜ. In the present instance, voltage monitoring SÜ only responds to overvoltages. If, at any time, overvoltage is reported, i.e. SÜ=1, represented by J at the output of branch 12, the power supply relay Rel and, hence, the controller 1 are deactivated, through threshold 13 (AUS). An excessive power supply voltage could cause defective operation of the controller.

Once the relay contact "a" is closed (Rel=1, $V_{Mon}=1$), the level of the voltage across transistor $T_R$ and resistance R, i.e. voltage $U_1$, is monitored through input E1. A large $U_1$ which exceeds an upper limit value $U_{max}$ is an indication of an error which causes the control to be deactivated.

In addition to the foregoing, other circuits of controller 1 are monitored by monitoring circuit 4 as shown in FIG. 1 by input signals WD1, WD2 which are alternating signals originating from the so-called "watch-dog" circuits. The absence of such signals or a deviation from the predetermined frequency is indicative of an error.

Moreover, with the aid of a reset signal supplied to the circuit 4 through a reset input, the actuation of controller 1 can be precluded or the controller can be deactivated again. For example, the reset signal can be dependent on the correct level of a supply voltage. Any error message through one of the inputs described or only referred to (reset, WD1, WD2 etc.) causes the monitoring circuit 4 of FIG. 1 to clear the release signal Enable and, in addition, to block the transistor $T_R$ which, in turn, results in the deactivation of the power supply relay Rel and the opening of the working contact "a". Through these two measures, i.e. by clearing the release signal Enable and deactivating the power supply the controller 1, redundantly, is rendered inoperative. The actuator elements and the magnetic valves, respectively, the coils of which are designated by $L_1$, $L_2$ ... $L_n$, will then remain in their initial position in which at least a non-controlled braking is ensured.

Figure 3:
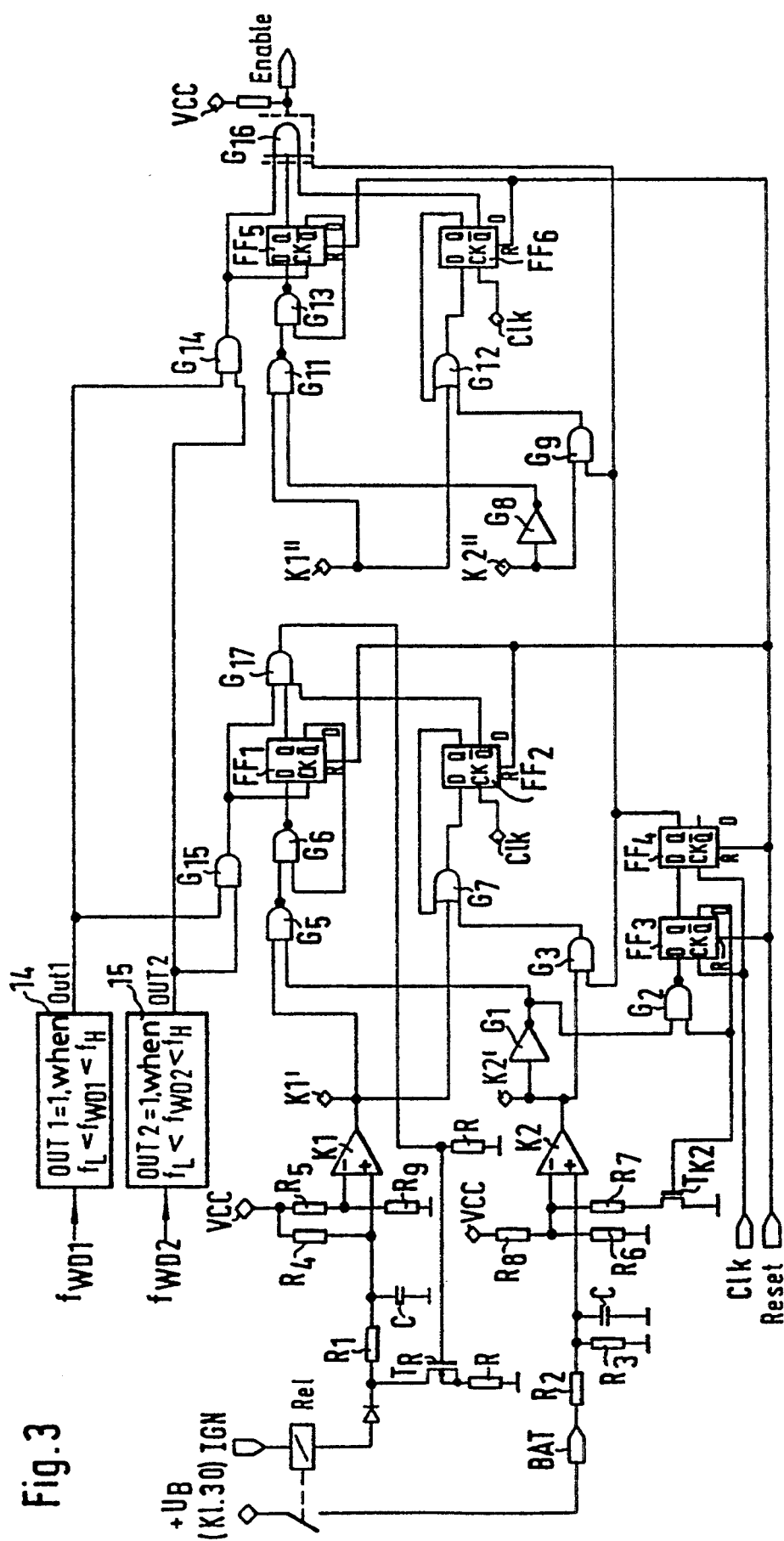
FIG. 3 shows an embodiment of the circuit configuration of FIG. 1.

FIG. 3 shows an embodiment of the circuit configuration 3 of the invention as described and illustrated in FIG. 1. Identical components and identical connections in FIGS. 1 and 3 have been provided with identical names and identical reference numerals, respectively. This applies, among other things, to the power supply relay Rel, the connections IGN and the terminal 30, the power supply contact "a" and the power supply switch transistor $T_R$.

The flow chart of FIG. 2 is also applicable to the circuit shown in FIG. 3. After actuation of the ignition IGN, all flip-flops, $FF_1$ to $FF_6$ of the circuit shown in FIG. 3, are reset through a reset signal. The reset signal is generated by the electronic system upon each activation of the ignition IGN and is released in the form of a pulse having a duration of some milliseconds. The duration of the reset pulse is adequate to place comparators K1 and K2 into a stable switching condition; that is to say, the transient oscillations will have subsided after this spell of time. Upon termination of the reset pulse, the actuation cycle takes its course in accordance with the flow chart of FIG. 2.

Applied to the inputs $f_{WD1}$ and $f_{WD2}$, respectively, are alternating signals which, in known manner, are generated by "watch-dog" circuits of the electronic system of the controller (not shown) and the absence or deviation of which from the predetermined frequency is indicative of an error in the electronic system of the controller. Consequently, a check is performed by the window comparators 14, 15 as to whether the frequency of the input signals $f_{WD1}$ and $f_{WD2}$, respectively, is within an upper and lower limit value $f_H$ and $f_L$, respectively. If the conditions have been complied with, the following applies to the output signals of the comparators 14 and 15, respectively: OUT1 = 1, OUT2 = 1. The levels at the output and the switch conditions of the comparators K1, K2, respectively, will be stored in flip-flop $FF_1$ as soon as a positive flank appears at the output of an AND gate $G_{15}$. The following applies with respect to the voltages across the input of the comparators K1, K2: Q-output Q of flip-flop $FF_1$ will be "1" if (1.) voltage across K1+ > voltage on K1− and
(2.) voltage across K2+ < voltage on K2−.

$Q_{FF1} = 0$ if one of the foregoing requirements (1.) or (2.) has not been complied with. This condition can only be cleared by deactivating the operating voltage.

The reference voltage across the input of the comparator K1 is set by a voltage divider $R_5$ and $R_9$ (in the present instance: $U_{Ref} = 2.5$ V). As described with reference to FIG. 1, in FIG. 3, the state of the switch transistor $T_R$ is monitored with the aid of comparator K1, the inputs of which are connected, through resistor $R_1$ to the relay winding Rel and the ignition switch contact IGN. At the time of excitation or actuation of the ignition switch IGN, transistor $T_R$, at first, is blocked from conducting.

The reference voltage across comparator K2 is detected by resistors $R_8$, $R_6$ and $R_7$ as transistor $T_{K2}$, following a reset, is activated by the output Qbar of flip-flop $FF_3$; in the present instance, $U_{Ref1} = 1.5$ V applies. As mentioned in the foregoing, the comparator K2, prior to activating the power supply relay Rel and closing of the power supply contact "a" serves to monitor the separating position of the contact "a"; in this manner, a "sticking condition" of the relay contact "a" is detected in time.

If, in the present case, the activating requirements $U_{Prüf} > 2.5$ V where, $U_{Prüf}$ is the voltage across the input of the comparator K1), $$U_B \times \frac{R_3}{R_2 + R_3} < 1.5$$

have been complied with, the switch condition across Q of flip-flop $FF_1$, as shown in FIG. 3, takes the value 1. That condition can be changed by a reset signal. As the output of the AND gate $G_{15}$, as shown in FIG. 3, is already 1 and as, $Qbar_{FF2} = 1$, transistor $T_R$ and, hence, the power supply relay are excited through the AND gate $G_{17}$.

Terminals K1' and K2' are galvanically connected to K1" and K2" respectively

The switch condition across the flip-flop $FF_5$ thus corresponds to the switch condition of $FF_1$; however, the signal condition across output Q of flip-flop $FF_4$, at first, is still 0. Consequently, the output of the AND gate $G_{16}$ continues to remain 0.

After closing of the working contact "a" of the power supply relay Rel, the voltage across the input of the comparator K2 rises above the threshold value which, in the present instance, is 1,5 V. The output signal of the comparator K2 will be "1". As the gate $G_3$, through flip-flop $FF_4$ is still blocked, the signal condition "1" across the output of the comparator K2 is transferred only through gate $G_2$ to the input of the flip-flop $FF_3$. Along with the next positive flank of the clock signal (CLK), the signal condition across the output of K2 is received by flip-flop $FF_3$. Once the signal condition across the output of comparator K2 becomes "1", that condition is stored until release of the next reset signal is released. At the same time, transistor $T_{K2}$ is deactivated, the power branch of resistor $R_7$ is high-ohmic and, consequently, the reference voltage across the input of the comparator K2 is increased, in the present instance to 3.5 V. The signal across the output of the comparator K2 will thereby be 0 again. This means a switchover to the overvoltage identification which, in FIG. 1, is represented by the switchover of the input of the monitoring circuit 4 from "$V_{Mon}$" to "SÜ". Following the next clock pulse, the output Q of the flip-flop $FF_4$ will be signal-carrying, i.e. "1", thereby generating the release signal Enable through the AND-gate 16. Moreover, through this flank of the clock pulse, the signal condition across the output of the comparator K2 also is switched through to flip-flops $FF_2$ and $FF_6$. Once the limit voltage, 3.5 V in the present instance which, in practice, corresponds to a battery voltage $U_B$ of over 18 V, is exceeded through the voltage divider $R_2$, $R_3$ across the input of the comparator K2, the resulting error will pass through gates $G_3$ and $G_7$ and register the error in flip-flop $FF_2$. The output Q of the flip-flop $FF_2$ will be 0, resulting in a blocking of transistor $T_R$ and, hence, in a deactivation of the power supply relay Rel. At the same time, the release signal Enable is cleared through the AND-gate $G_9$, the OR-gate $G_{12}$ and the flip-flop $FF_6$.

The short-time actuation of the comparator K2 in the process as described is necessary to check the operation of the comparator. As in normal operation, as long as no error occurs, the overvoltage deactivation does not take place. An error in the deactivation of the overvoltage could thus remain undetected.

Due to the simultaneous excitation of the deactivation of the power supply relay and the clearing of the release signal, the redundancy required by safety-critical controllers is attained through the response of the circuit configuration according to the invention to defective conditions or malfunctions.

We claim:

1. A circuit configuration for an electronic controller of a brake system having an electronic antilocking control and a traction slip control, said circuit configuration comprising a monitoring circuit which, upon detection of a defective condition, maintains in or restores to the initial position actuator elements excited by the controller, with a relay contact, having an opening and a separating position, of a power supply relay, during actuation of the controller for the power supply of the actuator elements being closed, characterized in that the monitoring circuit, during actuation of the controller, before closing of the relay contact first checks the connection of the relay to the power supply and the opening and separating position of the relay contact, subsequently excites the power supply relay and after the check of the supply voltage supplied through the closed relay contact generates a release signal for at least one of the controller and the excitation of the actuator elements.

2. A circuit configuration according to claim 1, characterized in that the monitoring circuit excites a transistor through which the power supply relay is actuatable, and that after actuation of the controller, first the blocking function of the transistor is checked by blocking the excitation of the transistor.

3. A circuit configuration according to claim 2, characterized in that the monitoring circuit, before or after the generation of the release signal, checks the level of the supply voltage supplied through the relay contact, and deactivates the power supply relay or clears the release signal once the supply voltage exceeds an upper threshold valve or falls below a lower threshold value.

4. A circuit configuration according to claim 2, characterized in that the monitoring circuit after generation of the release signal switches over to voltage monitoring and, again, deactivates the power supply relay once the supply voltage exceeds an upper threshold value.

5. A circuit configuration according to claim 4, characterized in that the monitoring circuit, simultaneously, monitors additional circuits of the controller which generate, in case of proper functioning, predetermined permanent signals or alternating signals of a predetermined frequency and, in the event of malfunction, deactivates the power supply relay or clears the release signal.

6. A circuit configuration according to claim 5, characterized in that the monitoring circuit monitors the output signals available in the form of alternating signals of a predetermined frequency and generated by so-called "watch-dog" circuits.

7. A circuit configuration according to claim 6, characterized in that the power supply relay is actuatable by exciting a transistor, and that the monitoring circuit responds once the voltage across the transistor, after excitation of the said transistor, exceeds a predetermined maximum value.

8. A circuit configuration according to claim 7, characterized in that an ohmic resistance is series connected with the transistor, and that the monitoring circuit responds once the voltage dropping across the transistor and across the resistance exceeds a predetermined maximum value.

9. A circuit configuration according to claim 1, wherein said monitoring circuit further includes means for checking said supply voltage after said release signal has been generated and for deactivating said power supply relay when said supply voltage exceeds an upper threshold value.

10. A circuit configuration according to claim 1, wherein said monitoring circuit responds to signals from the electronic controller representative of the functioning of components in the electronic controller and upon identification of a malfunction on any of said components clears said release signal.

11. A circuit configuration according to claim 1, wherein said monitoring circuit responds to signals from the electronic controller representative of the functioning of components in the electronic controller and upon identification of a malfunction on any of said components deactivate said power supply relay.

12. A circuit for an electronic controller having a plurality of actuatable elements, said circuit comprising:
 a power supply;
 a relay having a relay contact for selectively supplying supply voltage to the electronic controller; and
 a monitoring circuit having:
  (a) contact checking means for checking whether said relay contact opens and closes properly;
  (b) closing means for closing said relay contact to selectively supply said supply voltage to said electronic controller;
  (c) voltage checking meads for checking the supply voltage supplied through said relay contact to the electronic controller when said relay contact is closed;
  (d) signal generating means responsive to said contact checking means and said voltage checking means for selectively generating release signals to activate the controller; and
  (e) controller activating means for selectively activating the actuatable elements.

13. A circuit according to claim 12, further including:
 (a) a transistor for selectively controlling actuation of said power supply relay, and
 (b) wherein said monitoring circuit further includes:
  (1) transistor activating means for selectively activating said transistor, and
  (2) transistor checking means for checking operation of said transistor following activation of the controller.

14. A circuit according claim 13, wherein said monitoring circuit further includes second voltage checking means responsive to the voltage developed across said transistor after activation of said transistor and for actuating said power supply relay when said voltage across said transistor exceeds a predetermined maximum value.

15. A circuit according to claim 14, wherein said monitoring circuit further includes a resistor connected in series with said transistor and said second voltage checking means are responsive to the voltage developed across said transistor and said resistor after activation of said transistor and actuate said power supply relay when said voltage across said transistor and said resistor exceeds a predetermined maximum value.

16. A circuit according to claim 12, wherein:
 (a) said voltage checking means check the level of said supply voltage supplied through said relay contact before said release signal has been generated, and
 (b) said monitoring circuit further includes deactivating means for clearing said release signal when said supply voltage:
  (i) exceeds an upper threshold value,
  ii) falls below a lower threshold value.

17. A circuit according to claim 12, wherein:
 (a) said voltage checking means check the level of said supply voltage supplied through said relay contact before said release signal has been generated, and (b) said monitoring circuit further includes deactivating means for deactivating said power supply relay when said supply voltage:
  (i) exceeds an upper threshold value, or
  ii) falls below a lower threshold value.

18. A circuit according to claim 12, wherein:
(a) said voltage checking means check the level of said supply voltage supplied through said relay contact after said release signal has been generated, and
(b) said monitoring circuit further includes deactivating means for clearing said release signal when said supply voltage:
  (i) exceeds an upper threshold value, or
  ii) falls below a lower threshold value.

19. A circuit according to claim 12, wherein:
(a) said voltage checking means check the level of said supply voltage supplied through said relay contact after said release signal has been generated, and
(b) said monitoring circuit further includes deactivating means for deactivating said power supply relay when said supply voltage.:
  (i) exceeds an upper threshold value, or
  ii) falls below a lower threshold value.

20. A circuit for an electronic controller which excites actuatable elements, said circuit comprising:
a power supply;
a power supply relay connected to said power supply and having a relay contact which, during actuation of the controller, is closed and connects a supply voltage to the actuatable elements of the controller; and
a monitoring circuit for:
  (a) detecting a defective condition, malfunction, defective power supply,
  (b) maintaining the actuatable elements excited by the controller in their initial positions and restoring the actuatable elements excited by the controller to their initial positions,
  (c) first checking, during actuation of the controller before closing of said relay contact: (1) the connection of said relay to said power supply, and (2) the opening and separating position of said relay contact,
  (d) subsequently exciting said power supply relay,
  (e) checking the ,supply voltage supplied through the closed relay contact,
  (f) generating a release signal for at least one of the controller and the excitation of the actuator elements after checking the supply voltage.

* * * * *

UNITED STATES PATENT AND TRADEMARK OFFICE
CERTIFICATE OF CORRECTION

PATENT NO. : 5,411,324
DATED : May 2, 1995
INVENTOR(S) : Zydek et al.

It is certified that error appears in the above-identified patent and that said Letters Patent is hereby corrected as shown below:

In column 8, claim 16, line 62, add --or-- after "(i) exceeds an upper threshold value,"

Signed and Sealed this

Twelfth Day of September, 1995

Attest:

BRUCE LEHMAN

*Attesting Officer*          *Commissioner of Patents and Trademarks*